United States Patent [19]

Kurachi et al.

[11] Patent Number: 5,969,248
[45] Date of Patent: Oct. 19, 1999

[54] OSCILLATION TYPE ANGULAR VELOCITY SENSOR

[75] Inventors: Hideya Kurachi; Takayoshi Tsuzuki, both of Aichi-pref., Japan

[73] Assignee: Aisin Seiki Kabushiki Kaisha, Kariya, Japan

[21] Appl. No.: 09/018,054

[22] Filed: Feb. 3, 1998

[51] Int. Cl.⁶ .................................................. G01P 15/00
[52] U.S. Cl. ..................................................... 73/504.12
[58] Field of Search .......................... 73/504.02, 504.03, 73/504.04, 504.12, 504.14, 504.15, 504.16; 310/311, 314, 319

[56] References Cited

U.S. PATENT DOCUMENTS

| | | | |
|---|---|---|---|
| 4,489,609 | 12/1984 | Burdess et al. | 73/504.14 |
| 5,056,366 | 10/1991 | Fersht et al. | 73/504.15 |
| 5,131,273 | 7/1992 | Tabata et al. | 73/504.16 |
| 5,430,342 | 7/1995 | Watson | 310/316 |
| 5,460,043 | 10/1995 | Terajima | 73/504.12 |

FOREIGN PATENT DOCUMENTS

| | | |
|---|---|---|
| 4102013 | 4/1992 | Japan . |
| 4332814 | 11/1992 | Japan . |
| 6289043 | 10/1994 | Japan . |

*Primary Examiner*—Hezron Williams
*Assistant Examiner*—Richard A. Moller
*Attorney, Agent, or Firm*—Sughrue, Mion, Zinn, Macpeak & Seas, PLLC

[57] ABSTRACT

An oscillation type angular velocity sensor includes an oscillator, as exciting device for exciting the oscillator, a detecting device for detecting the direction of oscillation of the oscillator which occurs by a Coriolis force acting on the oscillator when an angular velocity is applied thereto and a correction device adhered to a portion of the oscillator for correcting the direction of the oscillation of the oscillator by varying the elasticity of the portion of the oscillator.

10 Claims, 10 Drawing Sheets

OSCILLATION TYPE ANGULAR VELOCITY SENSOR

BACKGROUND OF THE INVENTION

The present invention relates to a oscillation type angular velocity sensor and in particular to an oscillation type angular velocity sensor in which an oscillation direction of an oscillator can be adjusted.

In a conventional sensor of this type, due to errors caused by the raw material, the physical properties and/or the shape of an oscillator, an existing exciting direction of the oscillator sometimes may deviate from a designed exciting direction thereof, resulting in an erroneous signal called a null voltage being mixed in a signal indicating an angular velocity of the oscillator and such an erroneous signal becomes one of several causes making the S/N rate of the sensor worse.

In order to cope with such a phenomena, methods for correcting the deflection or deviation of the excitation direction of the oscillator have been developed. One of these methods is to cut off a portion of the oscillator as disclosed in Japanese Patent Laid-open Print No. Hei6 (1994AD)-289043. Another is to add a bit of bonding agent or solder on the oscillator as disclosed in Japanese Patent Laid-open Print No. Hei4 (1992AD)-332814. However, in the aforementioned adjustment of mass distribution in the oscillator, cutting-off and adding-on with respect to the oscillator are established such that a very small quantity is cut off and added on the oscillator, respectively in a stepwise manner. Thus it takes a long time for finishing such an adjustment which results in poor yield. In addition, the foregoing methods cannot be established while the oscillator is being oscillated and cannot be applied in the automatic production of the sensors.

SUMMARY OF THE INVENTION

It is therefore one of the objects of the present invention to provide an oscillation type angular velocity sensor without the foregoing drawbacks.

In order to attain the foregoing object, an oscillation type angular velocity sensor includes an oscillator, a detecting device for detecting the direction of oscillation of the oscillator which occurs by a Coriolis force acting on the oscillator when an angular velocity is applied thereto and a correction device adhered to a portion of the oscillator for correcting the direction of the oscillation of the oscillator by varying the apparent elasticity of the portion of the oscillator.

The above and other objects, features and advantages of the present invention will be more apparent and more readily appreciated from the following detailed description of preferred exemplary embodiment of the present invention, taken in connection with the accompanying drawings.

DETAILED DESCRIPTION OF THE INVENTION

Preferred embodiments of the present invention will be described hereinafter in detail with respect to the accompanying drawings.

Figure 1:
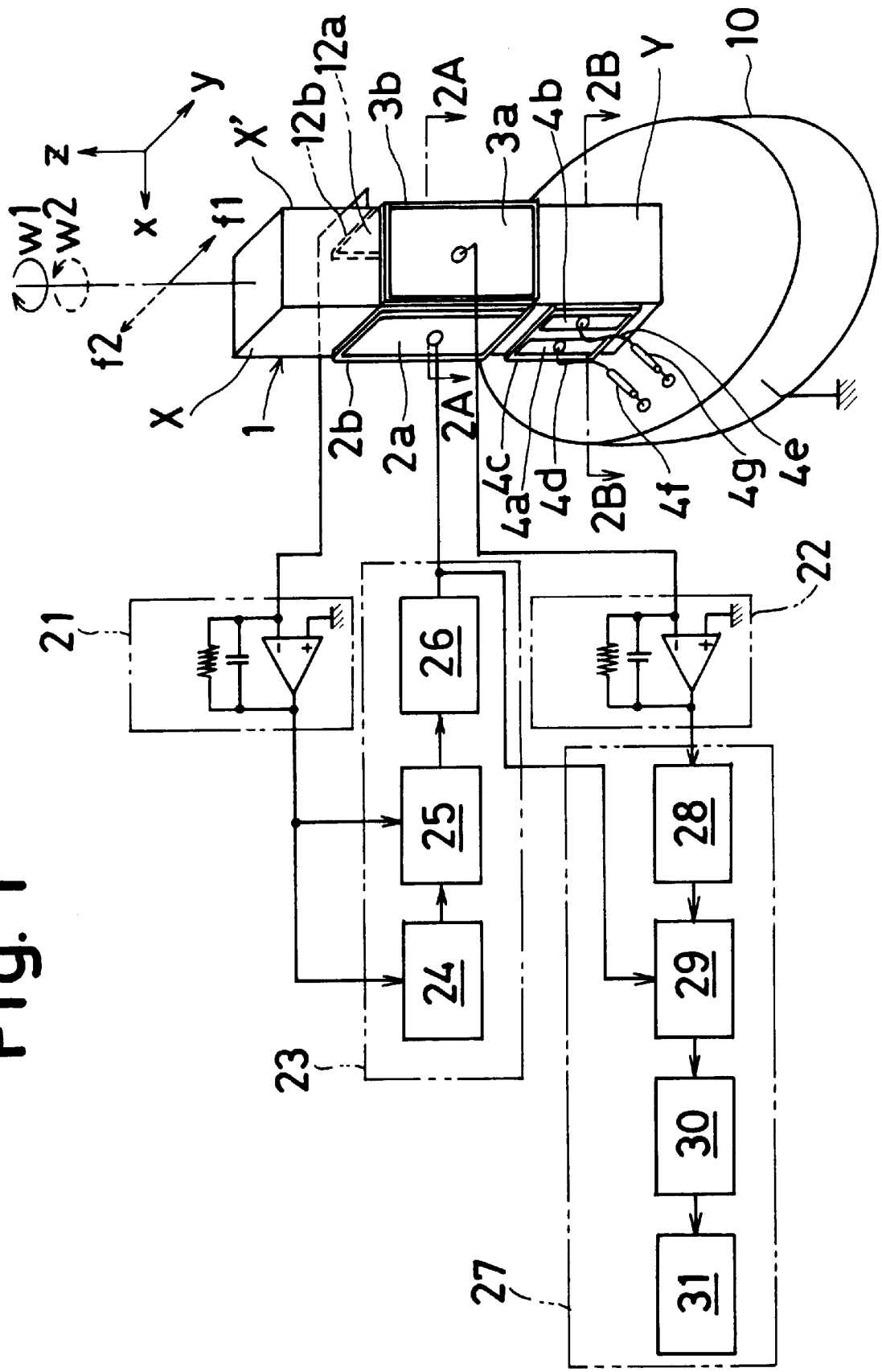
FIG. 1 is a perspective view of a first embodiment of an oscillation type angular velocity sensor according to the present invention.

Referring first to FIG. 1, a first embodiment of an oscillation type angular velocity sensor is illustrated. The sensor includes an oscillator 1 formed of an Elinvar alloy which is fixedly mounted on a base 10 in a cantilever manner. On an outer surface X of the oscillator 1, there is provided or adhered, a piezoelectric ceramic plate 2b on which a silver electrode 2a is printed by a screen printing process, while on another outer surface Y of the oscillator 1, there is provided or adhered a piezoelectric ceramic plate 3b on which a silver electrode 3a is printed by a screen printing process. On an outer surface X' of the oscillator 1, which is the reverse side of the outer surface X, there is provided a piezoelectric ceramic plate 12b on which a silver electrode 12a is printed by a screen printing process.

On the outer surface X of the oscillator 1, a piezoelectric ceramic plate 4c is adhered on which a pair of spaced silver electrodes 4a and 4b are printed by a screen printing process. The silver electrodes 4a and 4b are connected to metal coated resistors 4f and 4g via copper wires 4d and 4e, respectively. The piezoelectric plate 4c, the silver electrodes 4a and 4b, the metal coated resistors 4f and 4g, and the copper wires 4d and 4e constitute a vibration direction correction device as will be detailed later.

It is to be noted that the Elinvar alloy oscillator 1 is grounded to be kept at a reference voltage potential of 0 volts and is concurrently used as an earth terminal for each of the piezoelectric plates 2b, 3b, 4c and 12b.

If an AC voltage is applied to the silver electrode 2a as an exciting voltage, the oscillator 1 is brought into oscillation substantially in the x-direction. The resultant oscillation induces or produces another AC voltage or AC electric charge which has a phase difference relative to the exciting voltage. The induced voltage is filtered by a first charge amplifier 21 and the resultant voltage is fed, as a feed-back signal, to an AGC circuit 24 and an oscillation circuit 25. The oscillation circuit 25 is expected to generate an oscillation signal which is in synchronization with the feed-back signal, whereby the AGC circuit 24 corrects the amplitude of the oscillation signal to a set value by controlling the gain of the oscillation circuit 25 depending on the amplitude of the feed-back signal. The resultant oscillation signal is then fed to a phase shift circuit 26 by which the phase of the oscillation signal is adjusted for generating the exciting voltage in order that such exciting voltage may generate an oscillation in relation to feed-back loop. The resultant oscillation signal is applied to the silver electrode 2a. Thus the frequency of the exciting signal becomes a resonance frequency which is in coincidence with the proper or natural frequency of the oscillator 11, with the result that the oscillator 1 oscillates on the substantial resonance frequency under the same amplitude as the exciting voltage. The AGC circuit 24, the oscillation circuit 25 and the phase shift circuit 26 constitute a driving circuit 23.

While the oscillator 1 is in oscillation in the x-direction, if the oscillator 1 is applied with an angular velocity or speed ω 1 (ω 2) around an input axis z of the oscillator 1, a Coriolis force f1 (f2) which is in parallel to y-direction, thereby generating an AC voltage at the silver electrode 3a which is identical to the oscillation voltage of the oscillator 1. The resultant or detected voltage is filtered at a second charge amplifier 22 and is amplified by an amplifier circuit 28 before being fed to a detecting circuit 29. In the detecting circuit 29, the detected voltage is rectified in a low-pass filter or integration circuit 30 by detecting is oscillation components. The rectified voltage is fed to an output circuit 31 after being smoothed to a DC voltage. The level of the DC voltage fed to the output circuit 31 varies dependent upon whether the angular velocity is ω 1 or ω2. The amplifier circuit 28, the detecting circuit 29, the integration circuit 30 and the output circuit 31 constitute a detection circuit 27.

In the foregoing structure, it is possible to constitute another driving circuit without feed-back control by omitting the piezoelectric ceramics plate 12b and the silver electrode 12a. Such a structure can be put in practical use due to the fact that the thermal change of elasticity of the Elinvar alloy as a raw material of the oscillator 1 is very small which brings about little change of the proper oscillation number of the oscillator 1.

Figure 2:
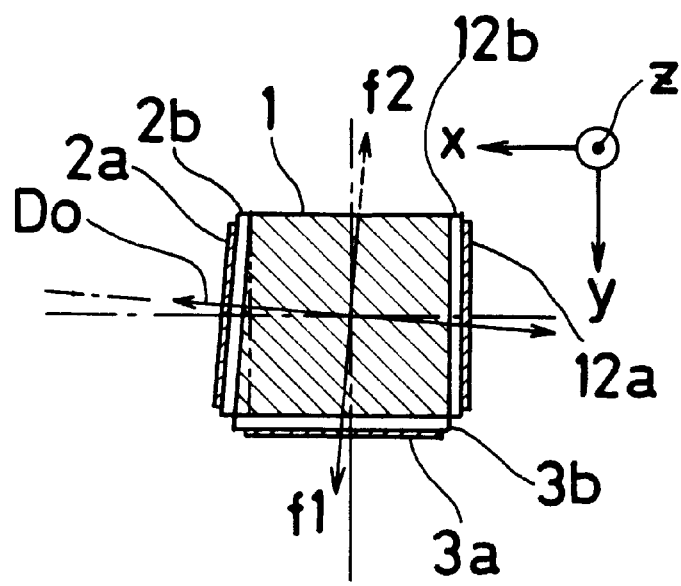
FIG. 2 is a cross-sectional view taken along line II—II in FIG. 1.
Figure 3:
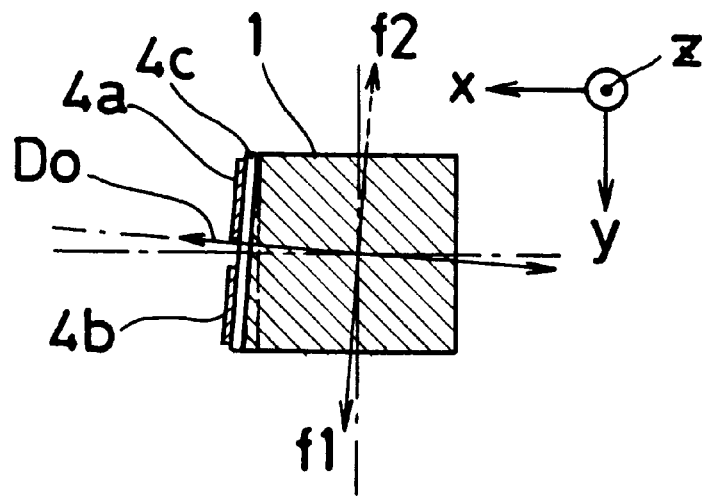
FIG. 3 is a cross-sectional view taken along line III—III in FIG. 1.

Unlike the foregoing description, when the shape of the oscillator 1 is asymmetric with respect to its central axis (angular velocity input axis z) or when the distribution of elasticity in the symmetric oscillator 1 is asymmetric due to residual stress generated in its formation, even when no angular velocity is applied to the oscillator 1, the oscillator 1 oscillates in the y-direction in addition to the x-direction. In FIGS. 2 and 3, there is depicted a real or deflected oscillation direction D0 which deflects a degree from the expected oscillation direction (x-direction) which is due to the asymmetric shape of the oscillator 1. In this case, a component of the oscillation (vector) is produced along y-direction. In light of the fact that an oscillation is produced along the y-axis upon application of angular velocity to the oscillator 1, such a component along the y-direction is mixed, as an error signal called or null voltage, with the detecting voltage, thereby decreasing the S/N rate.

In the foregoing structure, to avoid such a drawback, a correction of the oscillation direction is made by softening the elasticity of one portion of the piezoelectric ceramic plate 4c and hardening the elasticity of the other portion of the piezoelectric ceramic plate 4c. Such softening and hardening change the apparent elasticity of each portion of the oscillator 1, thereby correcting the oscillation direction of the oscillator 1 to the expected or designed direction.

A detailed explanation of the matter mentioned in the last paragraph is as follows. The electric charges produced at the piezoelectric ceramic plate 4c due to the oscillation of the oscillator 1 are discharged through the resistors 4f and 4g after passing through the silver electrodes 4a and 4b, respectively. The piezoelectric ceramic plate 4c acts as a voltage generator and is concurrently a capacitance element. The piezoelectric ceramic plate 4c and the resistors 4f and 4g connected thereto via the silver electrodes 4a and 4b, respectively, constitute an oscillation direction correcting device which is in the form of a CR time constant circuit. If the value of one of the resistors, for example, 4f, is large, it is difficult to discharge for the portion of the piezoelectric ceramic plate 4c on which the electrode 4a resides and the plate 4c is hard in appearance. On the other hand, if the value of the resistor 4f is small, it is easy to discharge for the portion of the plate 4c on which the electrode 4a resides and the plate 4c is soft in appearance. This would also be true for the resistor 4g. Thus adjusting the value of the resistor 4f or 4g brings a change of one portion or the other of the elasticity of the piezoelectric ceramic plate 4c, resulting in a variation in the distribution of the elasticity in the piezoelectric ceramic plate 4c. Depending on the resultant distribution variation, the oscillation direction of the oscillator 1 changes. In brief, adjusting the value of the resistor 4f or 4g changes the oscillation direction of the oscillator 1.

In light of the fact the value of the resistor 4f (4g) varies from 0 ohms to ∞ (infinite), a precise adjustment of the oscillation direction of oscillator 1 becomes possible. In addition, once an adjustment has been completed, re-adjustment can be established easily, for example, if the previous adjustment is found to be unsatisfactory. As the resistor 4f or 4g, a variable resistor or potentiometer is available. In this case, the potentiometer is adjusted to a desirable value and after such an adjustment, the potentiometer is replaced with a resistor having the resistive value identical to the adjust value of the potentiometer. In addition, trimming the value of the resistor 4f or 4g, during watching of the oscillation direction of the oscillator 1 is possible since it is made in such a manner that an initial value of the resistor 4f or 4g, is set to be slightly less than an estimated optimal value.

Figure 4:
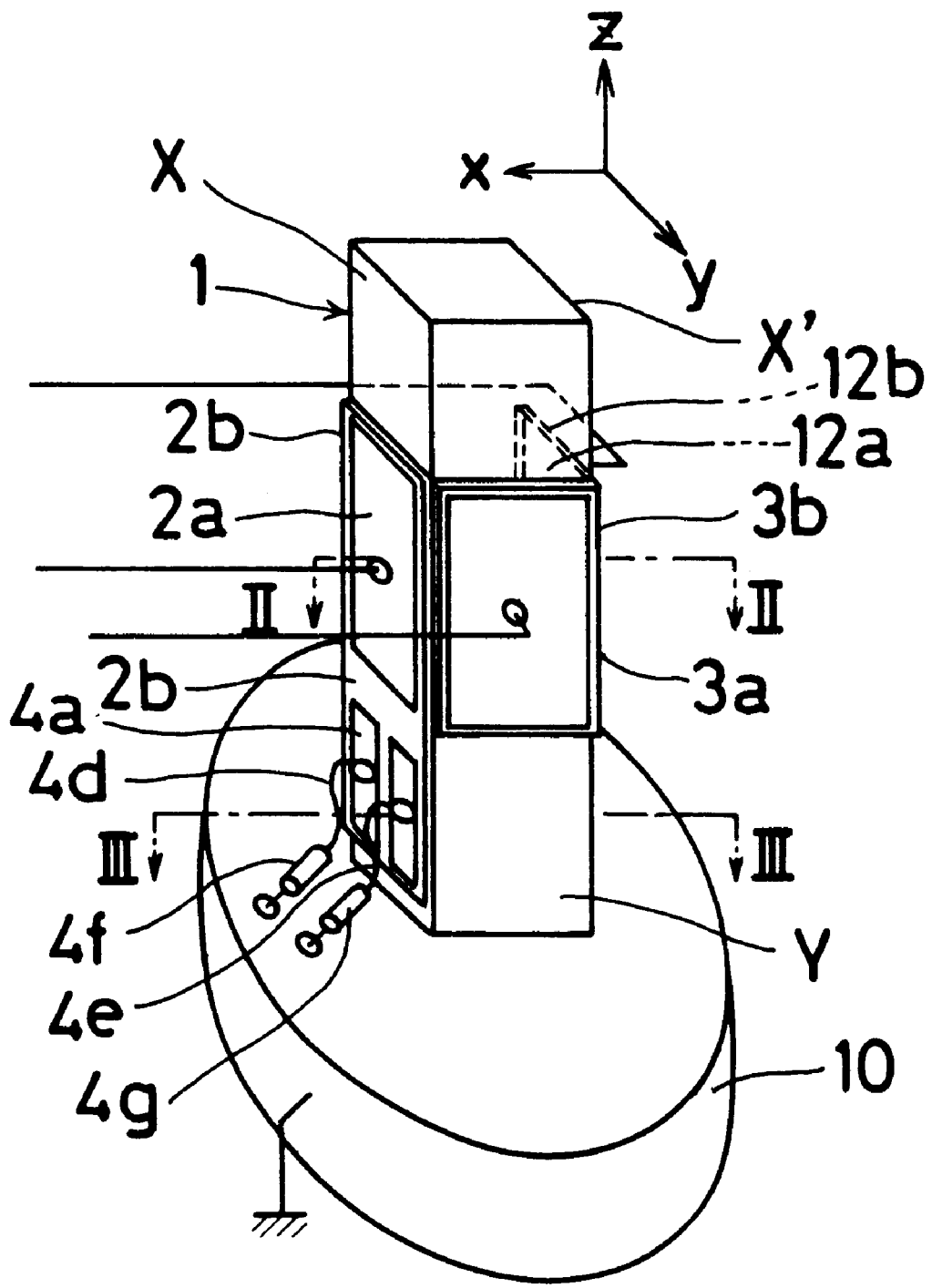
FIG. 4 is a perspective view of a second embodiment of an oscillation type angular velocity sensor according to the present invention.

Referring to FIG. 4, a second embodiment of an oscillation type angular velocity sensor according to the present invention is illustrated. This sensor is similar to that shown in FIG. 1 in concept and function except that in the embodiment of FIG. 4, the silver electrodes 4a and 4b are provided on the piezoelectric ceramic plate 2b. In other words, integrating the piezoelectric ceramic plate 4c to the piezoelectric ceramic plate 2b in the structure shown in FIG. 1 results in the structure shown in FIG. 4.

In this embodiment, the number of parts is less than that of the first embodiment so that the sensor according to the second embodiment can be produced by a more simplified manufacturing process. The position of each of the electrodes 2a, 4a and 4b relative to the others can be fixed precisely by employing the screen printing method and the central point of the electrode 2a which is the central point of the oscillation, can be determined relative to the central point of each of the electrodes 4a and 4b which is the elasticity adjusting point.

Figure 5:
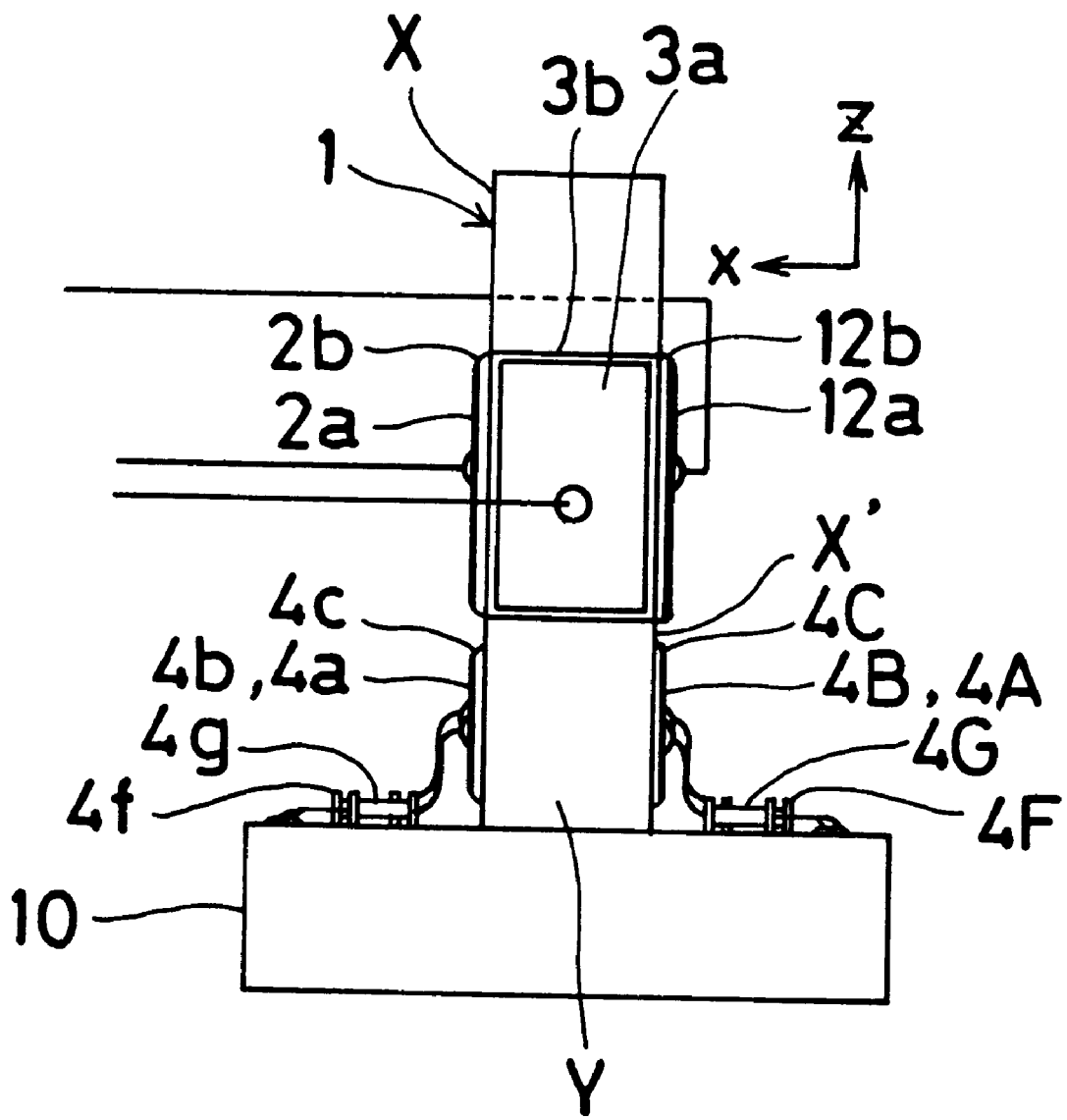
FIG. 5 is a side view of a third embodiment of an oscillation type angular velocity sensor according to the present invention.

In FIG. 5, a third embodiment of an oscillation type angular velocity sensor according to the present invention is illustrated. In this embodiment, on an outer surface X', which is the reverse side of the outer surface X, a second oscillation direction corrective device is provided which is in the form of a CR time constant circuit. The second oscillation direction correction device is constituted by a piezoelectric ceramic plate 4c, a pair of spaced silver resistors 4F and 4G connected to the plate 4C via silver electrodes 4A and 4B, respectively. The elements 4A, 4B, 4C, 4D, 4F and 4G of the second device are identical with the elements 4a, 4b, 4c, 4d, 4e, 4f and 4g and the first mentioned oscillation direction correction device, respectively. Employing two oscillation direction correcting devices on opposed surface of the oscillator 1, which are on the x-direction, enables a more precise correction of the oscillation direction relative to the z-axis and an expansion of the correction range of the resonant frequency in comparison with a sole oscillation direction correcting device provided for the sensor.

Figure 6:
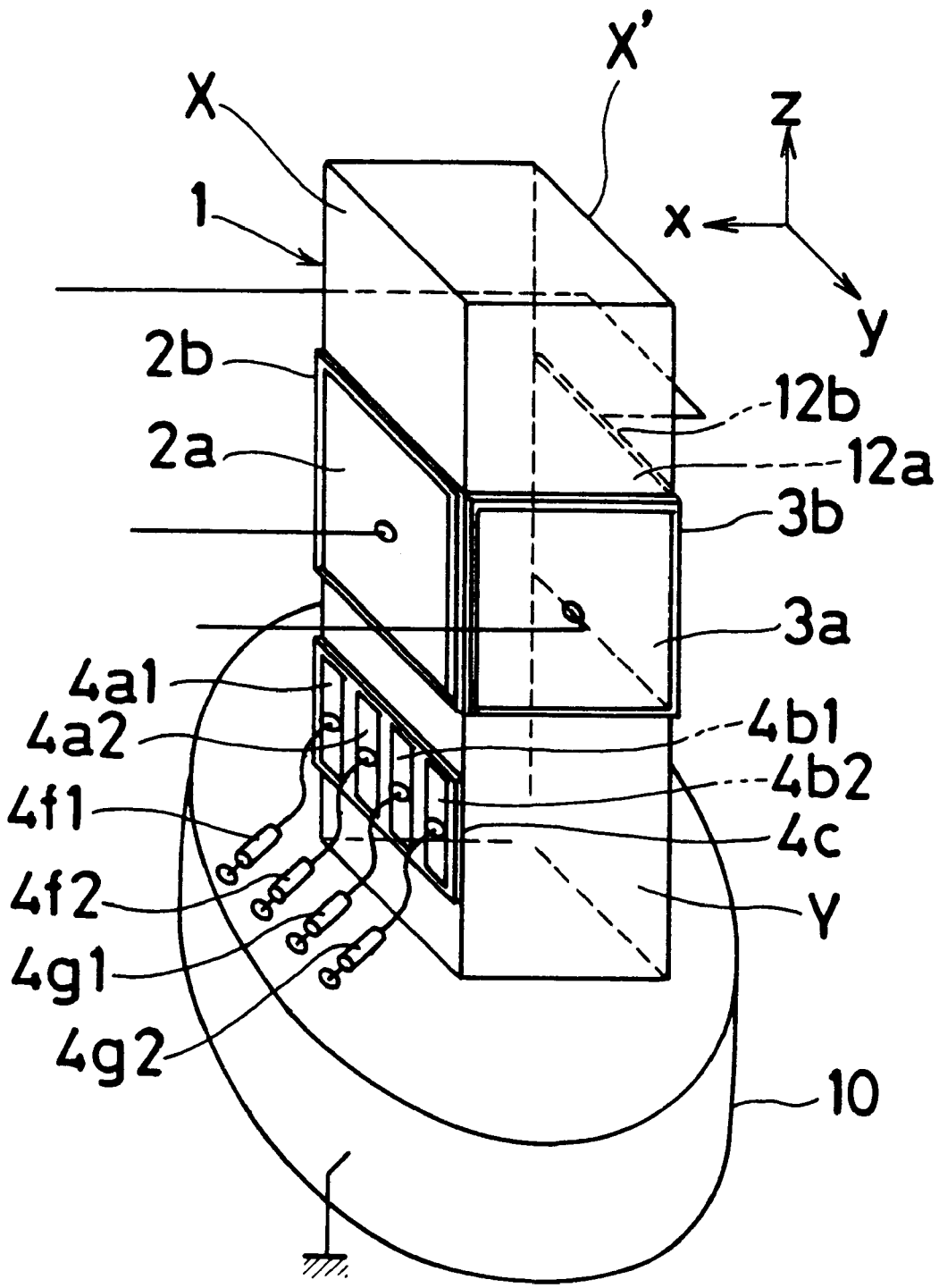
FIG. 6 is a perspective view of a fourth embodiment of an oscillation type angular velocity sensor according to the present invention.

Referring to FIG. 6, a fourth embodiment of an oscillation type angular velocity sensor according to the present invention is depicted. In this sensor, instead of the pair of spaced electrodes 4d and 4e on the piezoelectric ceramics plate 4c, four spaced electrodes 4a1, 4a2, 4b1 and 4b2 are employed. The set of electrodes 4a1 and 4a2 and the set of electrodes 4b1 and 4b2 are each in the form of a two part division of the electrodes 4a and 4b, respectively. Such a structure enables a more precise apparent elasticity distribution in the y-direction of the oscillator 1 so that further precise adjustment of the oscillation direction is possible. It is to be noted that the number of divisions can be chosen to be an even number greater than 4.

Figure 7:
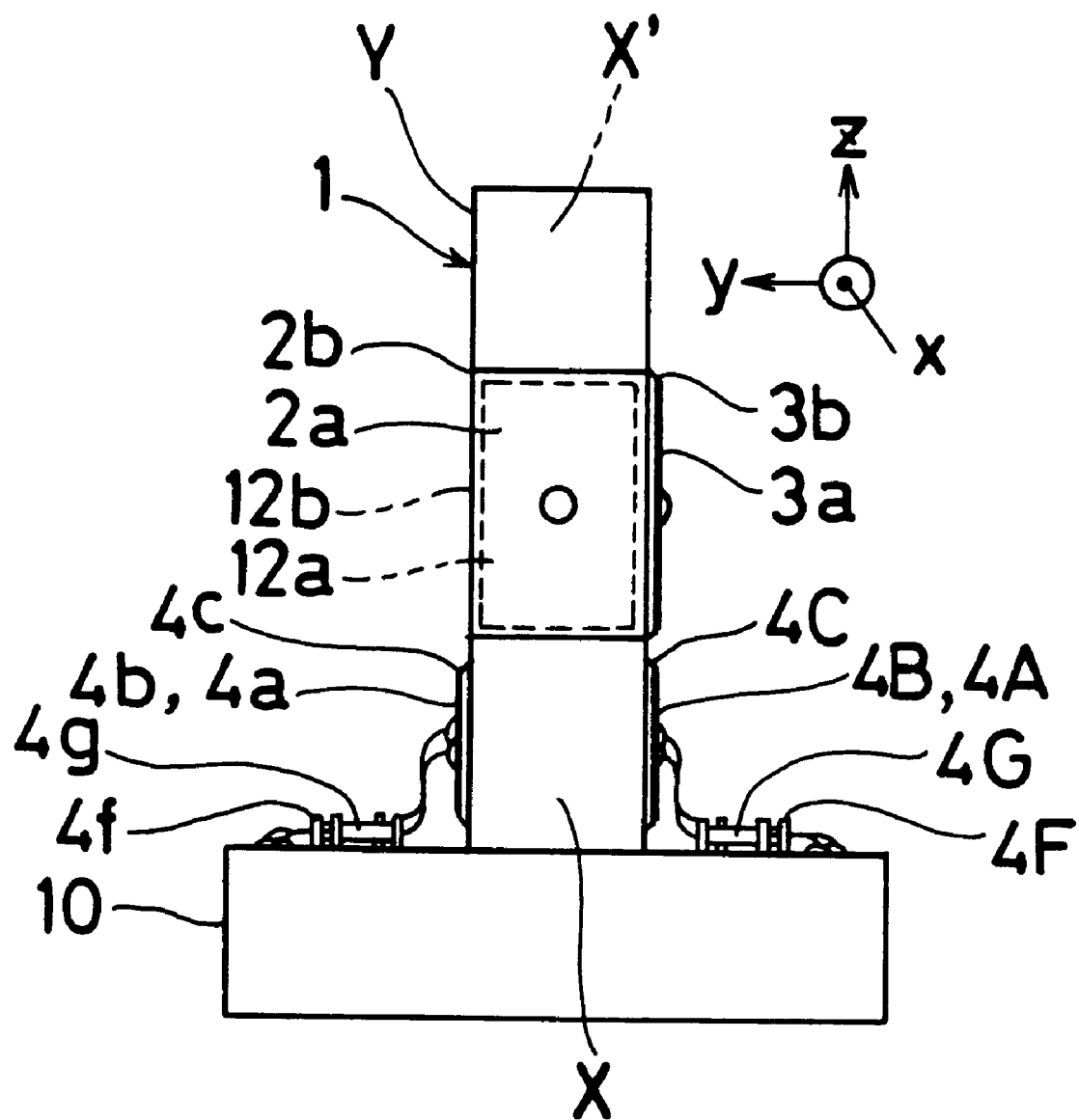
FIG. 7 is a side view of a fifth embodiment of an oscillation type angular velocity sensor according to the present invention.

A fifth embodiment of an oscillation type angular velocity sensor according to the present invention is shown in FIG. 7. On a first outer surface X, a second outer surface Y, which is perpendicular to the outer surface X and a third outer surface X', which is the side opposite the outer surface X of the oscillator 1, there are provided a piezoelectric ceramic plate 2b with a silver electrode 2a which serves as an oscillator, a piezoelectric ceramic plate 3b with a silver electrode 3a, which is used for feedback control and a piezoelectric ceramic plate 12b with a silver electrode 12a, which serves for detection of oscillation direction deviation, respectively. In addition, a piezoelectric ceramic plate 4c, acting as a first oscillation direction correcting device having a pair of silver electrodes 4a and 4b, is adhered to a fourth outer surface Y' which is the opposite side of the second outer surface Y. On the second outer face Y, there is adhered a piezoelectric ceramic plate 4C having thereon a pair of silver electrodes 4A and 4B, which constitutes a second oscillation direction correcting device. The electrodes 4a, 4b, 4A and 4B are grounded via resistors 4f, 4g, 4F and 4G, respectively. Adjusting the resistive values of one or more of these resistors will overcome or restrict a torsion around the z-axis.

Figure 8:
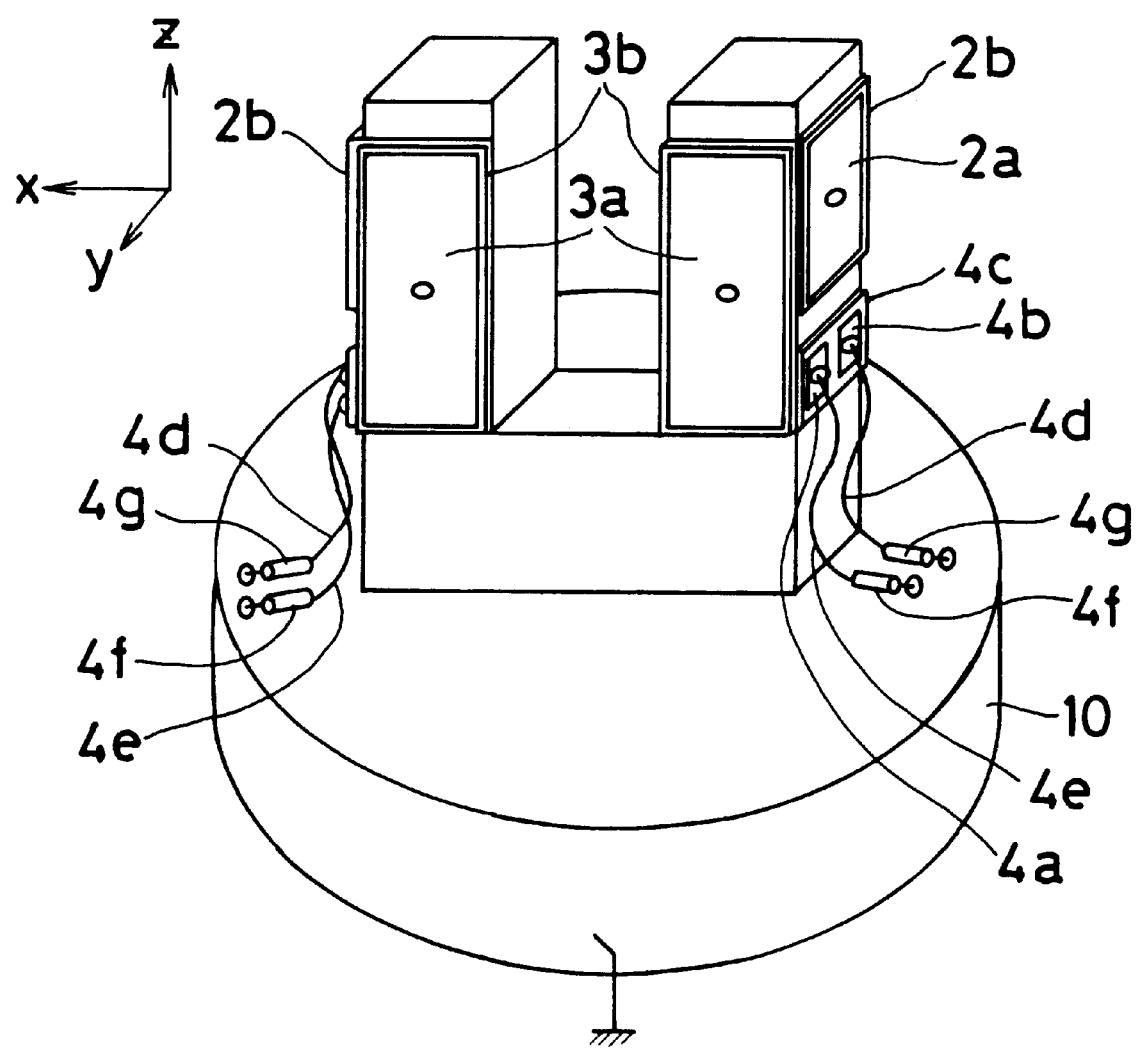
FIG. 8 is a perspective view of a sixth embodiment of an oscillation type angular velocity sensor according tot he present invention.

Unlike the foregoing embodiments in which the cantilevered oscillators are disclosed, in the embodiment as shown in FIG. 8, an oscillator 1 can be formed into a tuning fork shaped configuration. Such a structure establishes a correction of a y-direction oscillation deviation.

Figure 9:
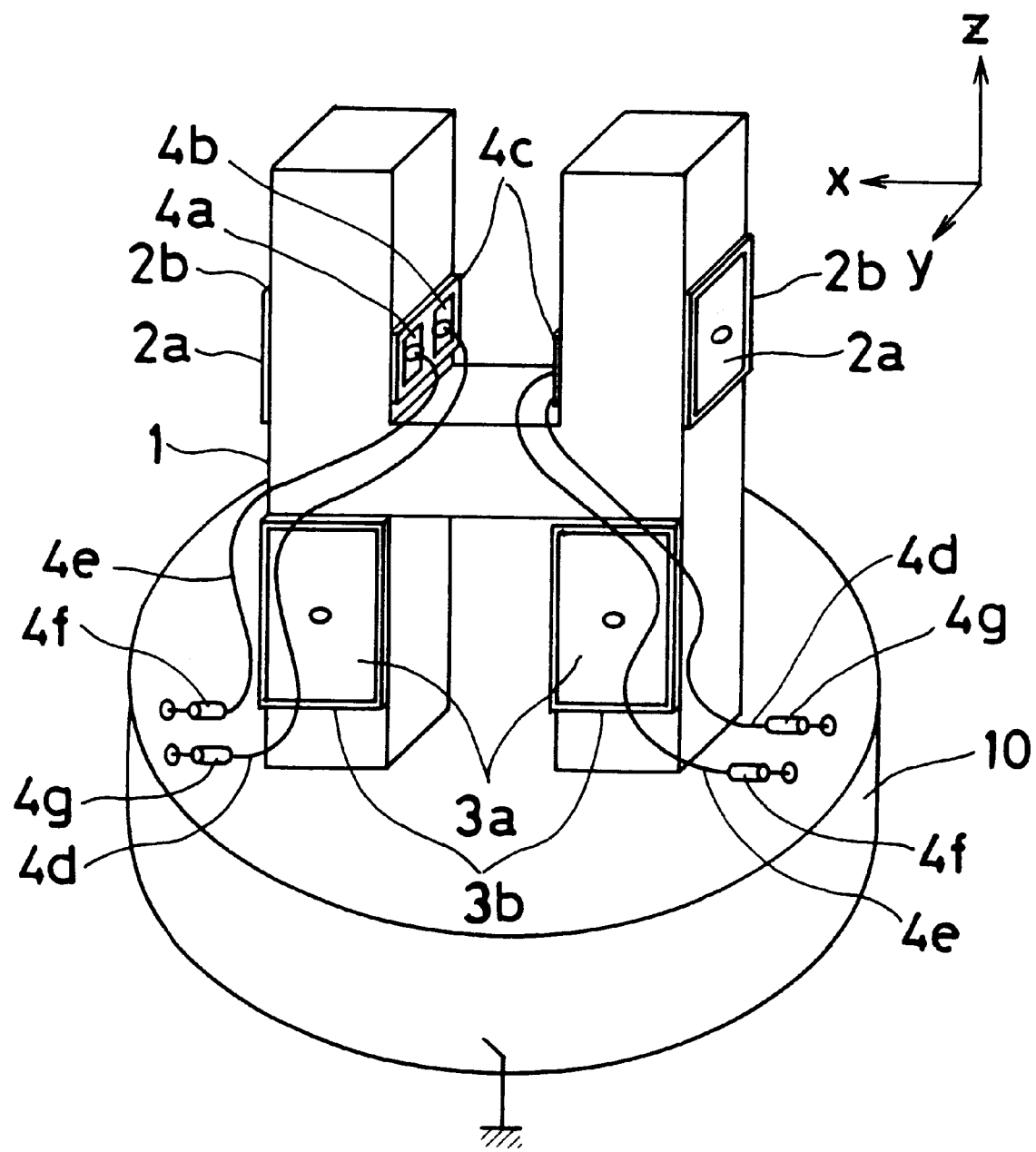
FIG. 9 is a perspective view of a seventh embodiment of an oscillation type angular velocity sensor according tot he present invention.

As shown in FIG. 9, an oscillator 1 is formed into an H-shaped configuration and piezoelectric ceramic plates 4c for correcting an oscillation deviation are adhered to upper opposed inside surfaces of the oscillator 1.

Figure 10:
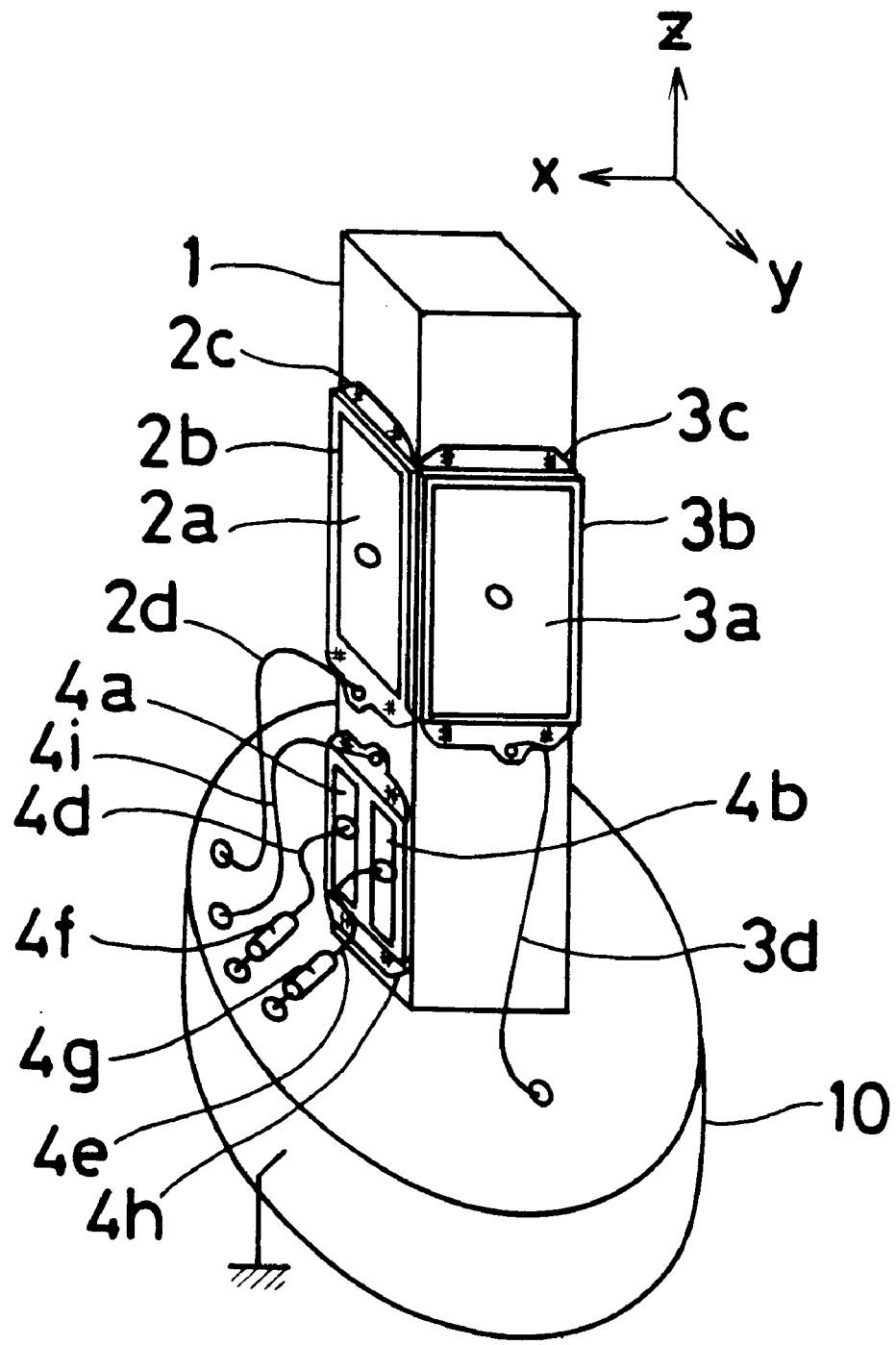
FIG. 10 is a perspective view of an eighth embodiment of an oscillation type angular velocity sensor according to the present invention.

As shown in FIG. 10, an oscillation type angular velocity detector according to an eighth embodiment of the present invention is disclosed. The oscillator 1 is made of non-conductive material. Such an oscillator 1 becomes equivalent to an oscillator made of conductive material by inserting grounded electrodes 2c, 3c and 4h between the oscillator 1 and the respective piezoelectric ceramic plates 2b, 3b and 4c which are grounded via wires 2d, 3d and 4i, respectively.

Figure 11:
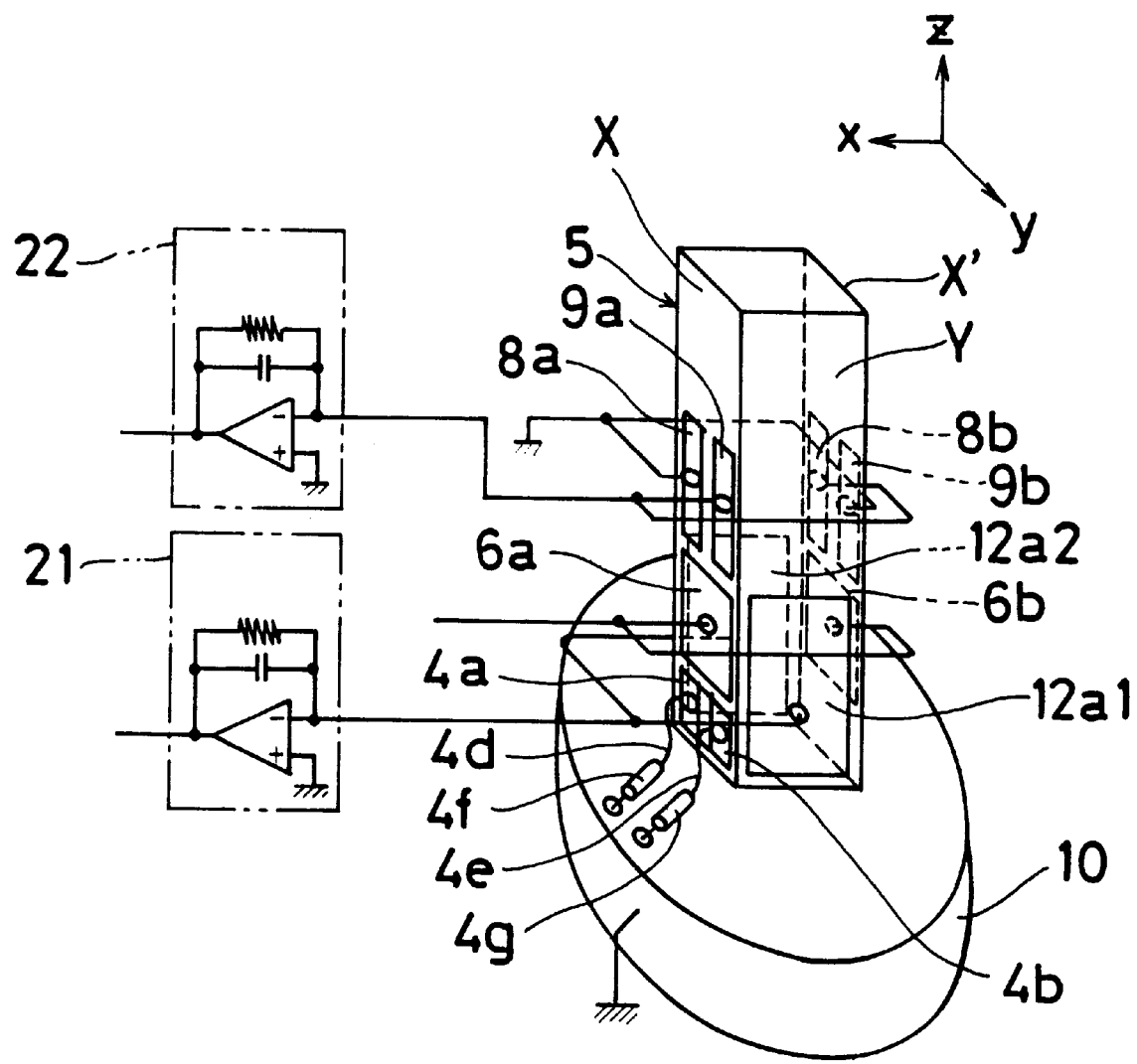
FIG. 11 is a perspective view of a ninth embodiment of an oscillation type angular velocity sensor according to the present invention.

Referring to FIG. 11, there is disclosed a ninth embodiment of an oscillation type angular velocity detector according to the present invention. In this embodiment, an oscillator 5 is formed of a piezoelectric ceramic and is directly adhered with a pair of spaced silver electrodes 4a and 4b which are used for correction of an oscillation direction deviation. On a first outer surface X and a third outer surface X', which is the opposite side thereof, there are provided silver electrodes 6a and 6b, respectively which serves for an excitation. On a second outer surface Y and a fourth outer surface Y', which is the opposite side thereof, there are provided silver electrodes 12a1 and 12a2 connected to a first charge amplifier 21. While the electrodes 12a1 and 12a2 generate a constant AC voltage, a feedback signal is output from the charge amplifier 21. On the first outer surface X, there are provided a pair of spaced silver electrodes 8a and 9a, which extend in y-direction for detecting angular velocity. On the third outer surface X' opposing the outer surface X, there is provided a pair of spaced silver electrodes 8b and 9b. As mentioned above, at a lower side of the exciting electrode 6a, there is provided a pair of spaced silver electrodes 4a and 4b, which extend in y-direction.

If an exciting voltage which is generated by the driving circuit, which is similar to that shown in FIG. 1, is supplied between the exciting electrodes 6a and 6b, an AC electric field is established between the electrodes 6a and 6b, which are kept at the constant reference voltage, thereby oscillating the oscillator 5 in x-direction. Similar to the sensor shown in FIG. 1, the resultant oscillation causes the feedback electrodes 12a1 and 12a2 to send feedback signals to the driving circuit via the charge amplifier 21. Upon an application of angular velocity ω to the oscillator 5, a Coriolis force is generated in the y-direction, thereby generating an electric field between the electrodes 8a and 8b and 9a and 9b. In this embodiment, each resultant electric field is fed to a detection circuit via the second charge amplifier 22.

The electrodes 4a and 4b for correcting the oscillation direction deviation are grounded via a wire 4d and a resistor 4f and another wire 4e and a resistor 4g, respectively, and on the basis of the same principle as mentioned in the description of the first embodiment, the oscillation direction deviation is corrected.

While the invention has been particularly shown and described with reference to preferred embodiments thereof, it will be understood by those in the art that the foregoing and other changes in form and details may be made therein without departing from the spirit and scope of the invention.

What is claimed is:

1. An oscillation type angular velocity sensor comprising:
    an oscillator;
    exciting means for exciting the oscillator;
    detecting means for detecting a direction of oscillation of the oscillator which occurs by a Coriolis force acting on the oscillator when an angular velocity is applied thereto;
    correction means adhered to a portion of the oscillator for correcting the direction of the oscillation of the oscillator by varying an apparent elasticity of the portion of the oscillator; and
    wherein the correction means includes a piezoelectric ceramic plate adhered to the oscillator, a correcting electrode provided on the piezoelectric ceramic plate and a resistor connected to the correcting electrode for discharging electric charges induced thereon and constituting a combination with the electrode.

2. An oscillation type angular velocity sensor as set forth in claim 1, wherein a plurality of combinations of the correcting electrode and the resistor are provided with each correcting electrode extending in a direction which is perpendicular to an exciting direction and parallel to an angular velocity input axis of the oscillator.

3. An oscillation type angular velocity sensor as set forth in claim 1, wherein a plurality of the combinations of the correcting electrode and the resistor is an even number, one half of the combinations being opposed to another half of the combinations along an exciting direction of the oscillator such that the oscillator is interposed between both halves of the combinations.

4. An oscillation type angular velocity sensor as set forth in claim 1, wherein a plurality of the combinations of the correcting electrode and the resistor is an even number, one half of the combinations being opposed to another half of the combinations along a direction which is perpendicular to an exciting direction of the oscillator.

5. An oscillation type angular velocity sensor as set forth in claim 1, wherein a plurality of the combinations of the correcting electrode and the resistor is an even number, one half of the combinations being opposed to another half of the combinations along a direction which is perpendicular to an exciting direction of the oscillator and an angular velocity input axis of the oscillator.

6. An oscillation type angular velocity sensor comprising:

an oscillator formed of piezoelectric ceramic material;

exciting means for exciting the oscillator;

detecting means for detecting a direction of oscillation of the oscillator which occurs by a Coriolis force action on the oscillator when an angular velocity is applied thereto;

wherein the correction means includes a correcting electrode provided on the oscillator, and a resistor connected to the correcting electrode for discharging electric charges induced thereon and constituting a combination with the correcting electrode.

7. An oscillation type angular velocity sensor as set forth in claim 6, wherein a plurality of the combinations of the correcting electrode and the resistor are provided with the correcting electrode extending in a direction which is perpendicular to an exciting direction of the oscillator and parallel to an angular velocity input axis of the oscillator.

8. An oscillation type angular velocity sensor as set forth in claim 6, wherein a plurality of the combinations of the correcting electrode and the resistor is an even number, one half of the combinations being opposed to another half of the combinations along an exciting direction of the oscillator such that the oscillator is interposed between both halves of combinations.

9. An oscillation type angular velocity sensor as set forth in claim 6, wherein a number of combinations of the correcting electrode and the resistor is an even number, one half of the combinations being opposed to another half of the combinations along a direction which is perpendicular to an exciting direction of the oscillator.

10. An oscillation type angular velocity sensor as set forth in claim 6, wherein a number of combinations of the correcting electrode and the resistor is an even number, one half of the combinations being opposed to another half of the combinations along a direction which is perpendicular to an exciting direction and an angular velocity input axis of the oscillator.

* * * * *

UNITED STATES PATENT AND TRADEMARK OFFICE
CERTIFICATE OF CORRECTION

PATENT NO. : 5,969,248
DATED : October 19, 1999
INVENTOR(S) : Hideya Kurachi et al.

It is certified that error appears in the above-indentified patent and that said Letters Patent is hereby corrected as shown below:

On the title page,

[30] Foreign Application Priority Data

-- Feb. 06, 1997    [JP]    Japan............09(1997)-23496

Signed and Sealed this

Twentieth Day of March, 2001

*Attest:*

NICHOLAS P. GODICI

*Attesting Officer*     *Acting Director of the United States Patent and Trademark Office*